(12) United States Patent
Sarokhan

(10) Patent No.: US 9,945,348 B2
(45) Date of Patent: Apr. 17, 2018

(54) OCEAN WAVE ENERGY CONVERTER INCLUDING CONTROL SYSTEM FOR DISABLING ACTIVE RECTIFICATION WHEN GENERATOR OUTPUT POWER IS LESS THAN A CONVERSION LOSS

(75) Inventor: Joseph Sarokhan, Basking Ridge, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 748 days.

(21) Appl. No.: 13/374,350

(22) Filed: Dec. 22, 2011

(65) Prior Publication Data

US 2013/0161948 A1 Jun. 27, 2013

(51) Int. Cl.
 *F03B 13/12* (2006.01)
 *F03B 13/14* (2006.01)

(52) U.S. Cl.
 CPC .......... *F03B 13/14* (2013.01); *F05B 2260/42* (2013.01); *F05B 2260/80* (2013.01); *F05B 2270/20* (2013.01); *F05B 2270/335* (2013.01); *Y02E 10/38* (2013.01)

(58) Field of Classification Search
 CPC .. F03B 13/14; F05B 2260/42; F05B 2260/80; F05B 2270/20; F05B 2270/335; Y02E 10/38
 See application file for complete search history.

(56) References Cited

U.S. PATENT DOCUMENTS

| | | | | |
|---|---|---|---|---|
| 5,457,624 A * | 10/1995 | Hastings | ............... | H02M 3/158 363/127 |
| 7,498,685 B2 * | 3/2009 | Turner | ........................... | 290/53 |
| 7,952,218 B2 * | 5/2011 | Welch et al. | ................... | 290/53 |
| 8,093,736 B2 * | 1/2012 | Raftery | .......................... | 290/42 |
| 8,129,852 B2 * | 3/2012 | Edwards et al. | ................. | 290/44 |
| 8,659,248 B2 * | 2/2014 | Miura | ............... | H02M 7/53875 318/400.01 |
| 8,830,705 B2 * | 9/2014 | Reichard | ............... | H02M 5/453 363/37 |
| 8,958,218 B2 * | 2/2015 | Reichard | ................... | G05F 1/67 363/37 |
| 9,024,594 B2 * | 5/2015 | Reichard | .................. | G05F 1/67 323/207 |
| 2007/0228737 A1 * | 10/2007 | Hirsch | ........................... | 290/42 |
| 2007/0261404 A1 * | 11/2007 | Stewart et al. | .................. | 60/495 |
| 2011/0163706 A1 * | 7/2011 | Miura | ............... | H02M 7/53875 318/400.27 |
| 2012/0063177 A1 * | 3/2012 | Garrity | ................... | H02J 3/383 363/37 |
| 2013/0113452 A1 * | 5/2013 | Reichard | ................... | G05F 1/67 323/299 |

(Continued)

*Primary Examiner* — Tulsidas C Patel
*Assistant Examiner* — S. Mikailoff
(74) *Attorney, Agent, or Firm* — Jonathan M. Pierce; Porter Hedges LLP

(57) ABSTRACT

An electric generator driven by a source of variable energy produces at its output an alternating current (AC) output voltage and current which is converted via controllable active switching circuitry into a direct current (DC) voltage which is stored in an energy storage element. Power losses are associated with the active switching circuit and the AC to DC conversion. The power available at the output of the generator can be determined. If the available power is less than the power losses the controllable switching circuitry is disabled.

15 Claims, 10 Drawing Sheets

(56) References Cited

U.S. PATENT DOCUMENTS

2013/0114312 A1* 5/2013 Reichard .................. G05F 1/67
363/37
2013/0155730 A1* 6/2013 Reichard .............. H02M 5/453
363/37
2014/0368143 A1* 12/2014 Breitzmann ............. H02P 3/22
318/400.22

* cited by examiner

OCEAN WAVE ENERGY CONVERTER INCLUDING CONTROL SYSTEM FOR DISABLING ACTIVE RECTIFICATION WHEN GENERATOR OUTPUT POWER IS LESS THAN A CONVERSION LOSS

BACKGROUND OF THE INVENTION

This invention relates to apparatus, systems and methods for processing and optimizing the power output generated by sources of energy where the voltage output varies substantially in amplitude and frequency as a function of time. A primary aim of the invention is to increase the net output power produced by such a source of energy.

Many sources of renewable energy, [e.g., wave energy converters (WECs), wind and solar] which are used to generate electrical energy, produce alternating signals whose amplitude and frequency vary over a wide range. This is most notable in ocean wave power generation systems where the rate (frequency) of the waves and their amplitude vary greatly; generally, in excess of those of most other applications. Accordingly, the invention will be discussed with respect to WEC systems for purpose of illustration. However, the invention is also applicable in other applications such as those using wind energy or solar thermal sources of energy, as well as applications such as electric vehicle regenerative breaking.

In general, the energy produced by, or present in, a source of renewable energy (e.g., ocean waves) is converted into mechanical energy which is used to drive an electrical generator (e.g., a rotary or linear generator). FIG. 1 is an illustrative example of a prior art wave energy converter system (WEC) which may be used to practice the invention. A spar 102 and a float 104 intended to be disposed in a body of water move relative to each other in response to the waves present in the body of water. A power take off device (PTO) 106 is coupled between the spar and float and includes apparatus to convert their relative motion into mechanical energy (force) which may be used to drive an electric generator (which may be included within the PTO, or external thereto) to produce a voltage output which, for purpose of illustration, may be as shown in FIG. 2.

FIG. 2 is a simplified profile of a possible voltage output generated by an electrical generator, as a function of time (t), driven by a WEC system of the type shown in FIG. 1. Note that for the periods from time t0 to t6, t7-t10, and t15-t18, the amplitude of the alternating voltage and/or current (providing power generation) is near the zero crossing point. As a result, for extended periods of time the corresponding power being generated is of very small amplitude.

It is known to rectify the alternating and variable output voltage of an electrical generator by means of a passive diode rectification system to charge a storage device such as a capacitor (or battery) to produce a DC voltage corresponding to the generator output. However, a passive diode system blocks conduction until the voltage at their anodes exceeds the voltage at their cathodes. So, for many conditions, a passive diode system is not effective to transfer charge from an electric generator to the storage device. Also, it is inefficient for the condition where the generator voltage output amplitude is not very large and a significant portion of the generated voltage and power is consumed in, or about, the diode rectifiers due to the voltage drops across the diodes.

To overcome these and other problems, it is preferable to use a power switching circuit, connected between the electric generator and a storage device, to rectify or convert the electric generators' alternating current (AC) output to a direct current (DC) voltage which is stored in the storage device. The power switching circuit may be an active current control pulse width modulation (PWM) circuit. The PWM circuit provides a much more controllable and consistent level of current control than passively rectified systems, and is capable of transferring energy from a low voltage generator output to a higher voltage DC bus However, the power switching circuit introduces power losses. Most power switching circuits are switched at frequencies in the kilohertz range. This causes core losses in the electric generator through eddy current induction. The active switching also results in losses in the power switching circuits due to semiconductor switching and conduction losses. These losses are generally unavoidable and are always present.

Applicant recognized that operating the power switching circuitry connected between an electric generator and a storage device (to rectify the generator output voltage) when the generator's output voltage is insufficient to exceed the switching and core loss overhead results in a significant loss and waste of power.

The nature of the problem may be explained by reference to the highly simplified schematic diagram of FIG. 3 which shows a single phase alternating current (AC) generator 350. The output voltage (Eg) of generator 350 is generally cyclical about the zero axis varying generally at a frequency in the range of less than 1 to 60 Hz or more. A power switching circuit 352 is connected between the generator 350 and a capacitor Cx to convert (and transfer) the AC voltage generated by the generator 350 into a DC voltage stored by Cx. The power switching circuit 352 includes a switch SW1 connected across the generator coil and a switch SW2 connected between the generator 350 and capacitor Cx. Switches SW1 and SW2 (which are not turned on at the same time) are switched (turned) on and off at a rate of several KHz [i.e., the switch rate, which may be in the range of 1 KHz to More than 10 KHz, is much higher than the frequency of the voltage generator output (Eg)].

Applicant recognized that for low values of generator voltage (Eg), instead of power being transferred via SW2 to charge the capacitor Cx, power is in fact drained from capacitor Cx and flows via switch SW2 into the coil of generator 350 also causing heating and core losses. Thus, for low values of generator voltage, more power is consumed by the switching-driving system than is supplied, whereby there is a net power loss.

Applicant also recognized that in wave energy conversion systems, a significant percentage of the power generation time occurs near the zero crossings of the input power waveform and the output voltage is of low amplitude. For the low amplitude condition, the associated switching overhead and core losses will consume more power than is produced. Minimizing these parasitic losses can improve net power generation, especially in low wave states.

Applicant also recognized that wave power generation systems typically have a high ratio of peak power to average power. Since power generation equipment must be sized according to the peak power requirements, wave power systems tend to have very large electric generators and associated drives installed. These large electric generators and their associated drives consume substantial amount of power for the standby and low power operation conditions. As a result, the net power production and efficiency of the wave power system is significantly reduced.

For example, a system that produces 200 watts on a yearly average might have/need a 15,000 watt generator and drive to handle the peak power requirements. If that 15,000 watt generator and drive had a 50 watt no load standby loss, it would only represent a 0.3% loss for ordinary applications. However, for wave power, the standby loss can consume 25% of the average production and is much more of a problem. If there are no waves at all, the drive and generator system can be simply shut down. However, it will take some time to re-initialize the system if the waves return and operation is desired. On low wave activity days, efficiency can drop to very low levels—there may be enough waves to justify keeping the generation equipment powered on in standby mode, but the standby losses may consume nearly all of the power production.

An object of the invention is to optimize the efficiency of the electrical conversion process in those systems where the input power profiles are cyclical and/or variable.

SUMMARY OF THE INVENTION

In accordance with the invention, in variable amplitude alternating current (AC) power generating systems, where the power generated is converted via a controllable conversion process which consumes power, the controllable converter is disabled when the power generated is less than the power consumed by the conversion process.

Thus, where an alternating current (AC) and variable amplitude electric generator output is processed by active power switching circuitry to convert the AC output to a DC level and charge an energy storage element (e.g., a battery or a capacitor), the active power switching circuitry is disabled when the amplitude of the generator output power is, or would be, below a predetermined level. The predetermined level is the level at which more power is consumed by the active power switching circuit than is being generated by the electric generator. This ensures that the active power switching circuitry does not contribute to a depletion of the energy stored in the storage element and increases the efficiency of the system.

In accordance with one embodiment of the invention, the alternating current (AC) and varying amplitude output of an electric generator are coupled via a controllable AC to DC converter across a charge storage element. The AC to DC converter includes a selectively operable active power switching circuit, which includes semiconductor drivers, coupled between the coils of an alternating current electrical generator and the charge storage element which may be an energy storage device, such as a capacitor or battery or any like device. The selectively operable active power switching circuit is controlled by a generator drive circuit which is programmed to shut down all active power switching and semiconductor drivers when placed in a power save mode by a master system controller. When the switching and current control functions have been disabled, the generator drive circuit still provides power to selected components of the system (e.g., to a generator rotary encoder and to circuitry which tracks rotor position and commutation synchronization) for enabling rapid response when the generator voltage increases above a minimum level.

In accordance with another aspect of the invention, if the duration of low power generating activity extends for a given period of time, then the power to the selected components of the system is turned off.

BRIEF DESCRIPTION OF THE DRAWINGS

In the accompanying drawings, like reference characteristics denote like components.

DETAILED DESCRIPTION OF THE DRAWINGS

Figure 1:
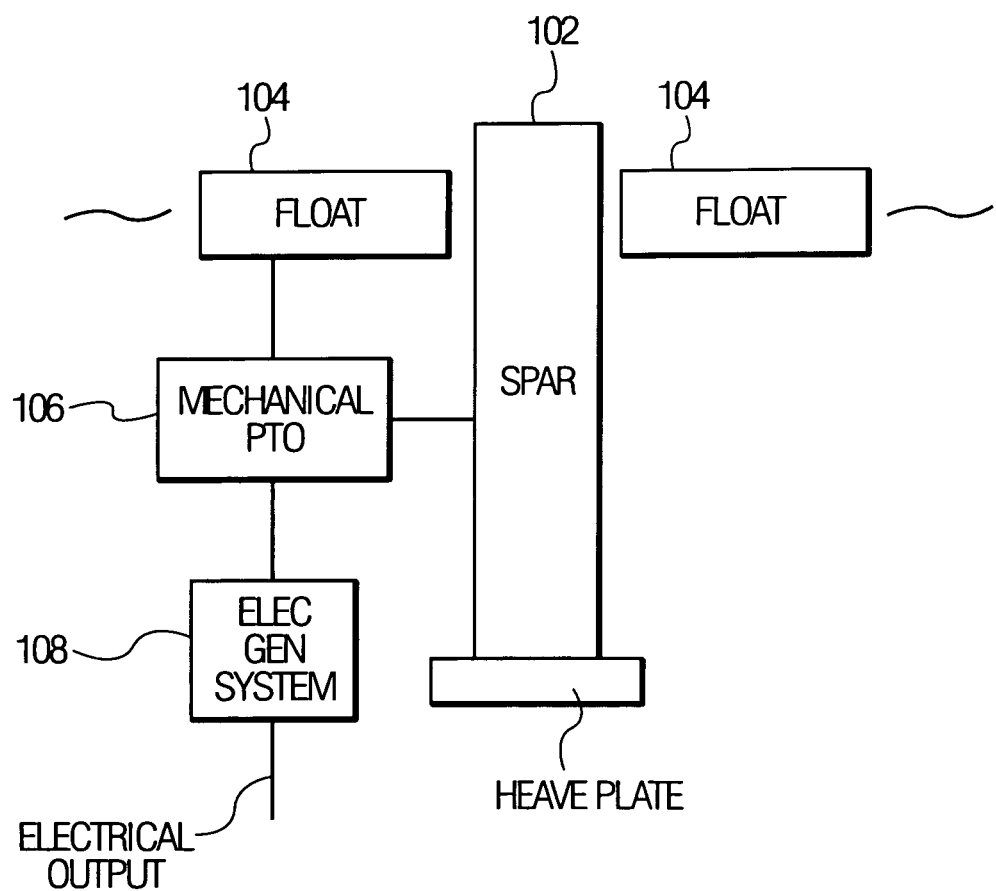
FIG. 1 is a simplified block diagram of a wave energy converter (WEC) with a power take off device (PTO) for driving an electric generator producing an output voltage whose amplitude and frequency is a function of the waves.

The invention will be illustrated in the context of a wave energy converter (WEC) system which (as shown in FIG. 1) includes a spar 102, with a heave plate, and a float 104 which move relative to each other in response to waves. A mechanical power take off device (PTO) 106 is connected between the spar and float and in response to their relative motion drives an electrical generator system 108 which converts the relative motion of the float and spar into electric energy.

Figure 2:
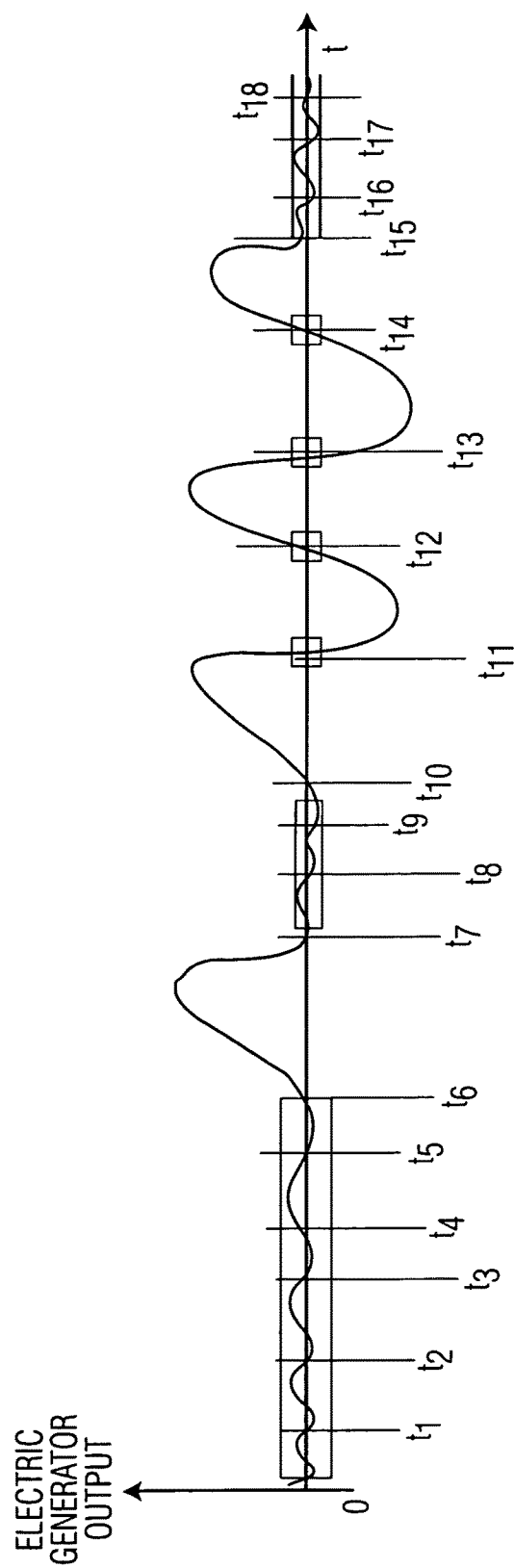
FIG. 2 is a drawing of a possible voltage output as a function of time produced by an electrical generator driven by a WEC's mechanical PTO.
Figure 3:
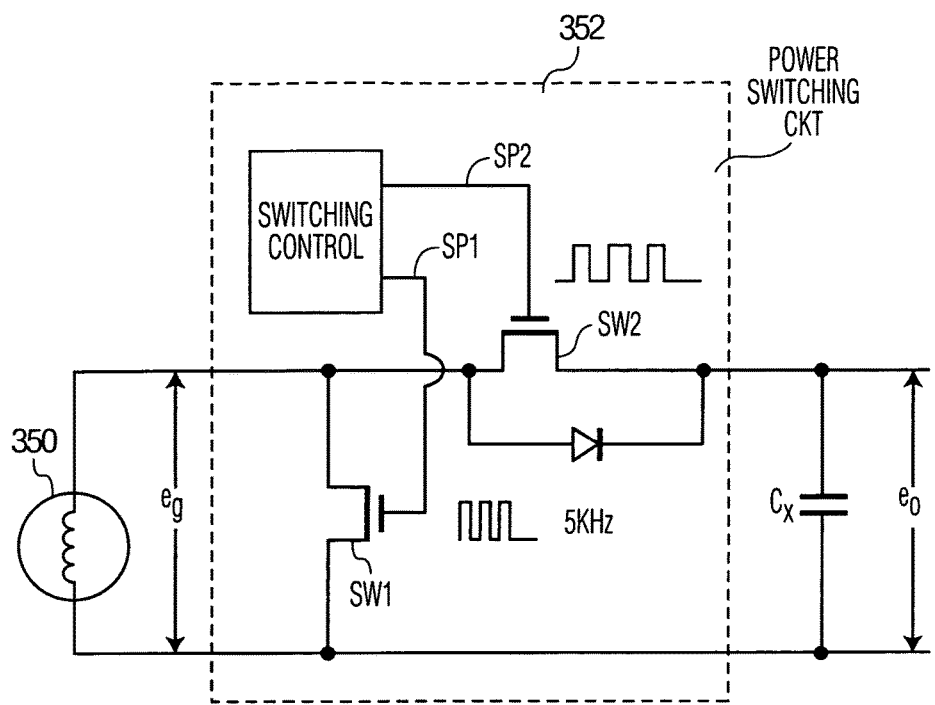
FIG. 3 is a block diagram of prior art circuitry showing a power switching circuit for converting the alternating (AC) output of an electrical generator to a DC voltage.
Figure 3A:
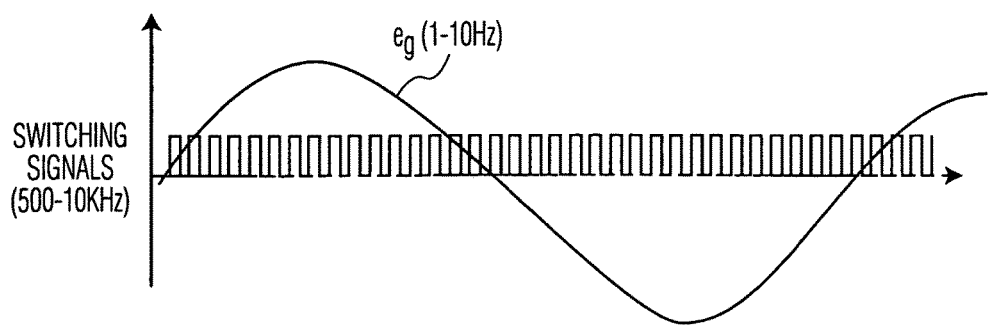
FIG. 3A is a diagram of waveforms associated with the circuit of FIG. 3.
Figure 4:
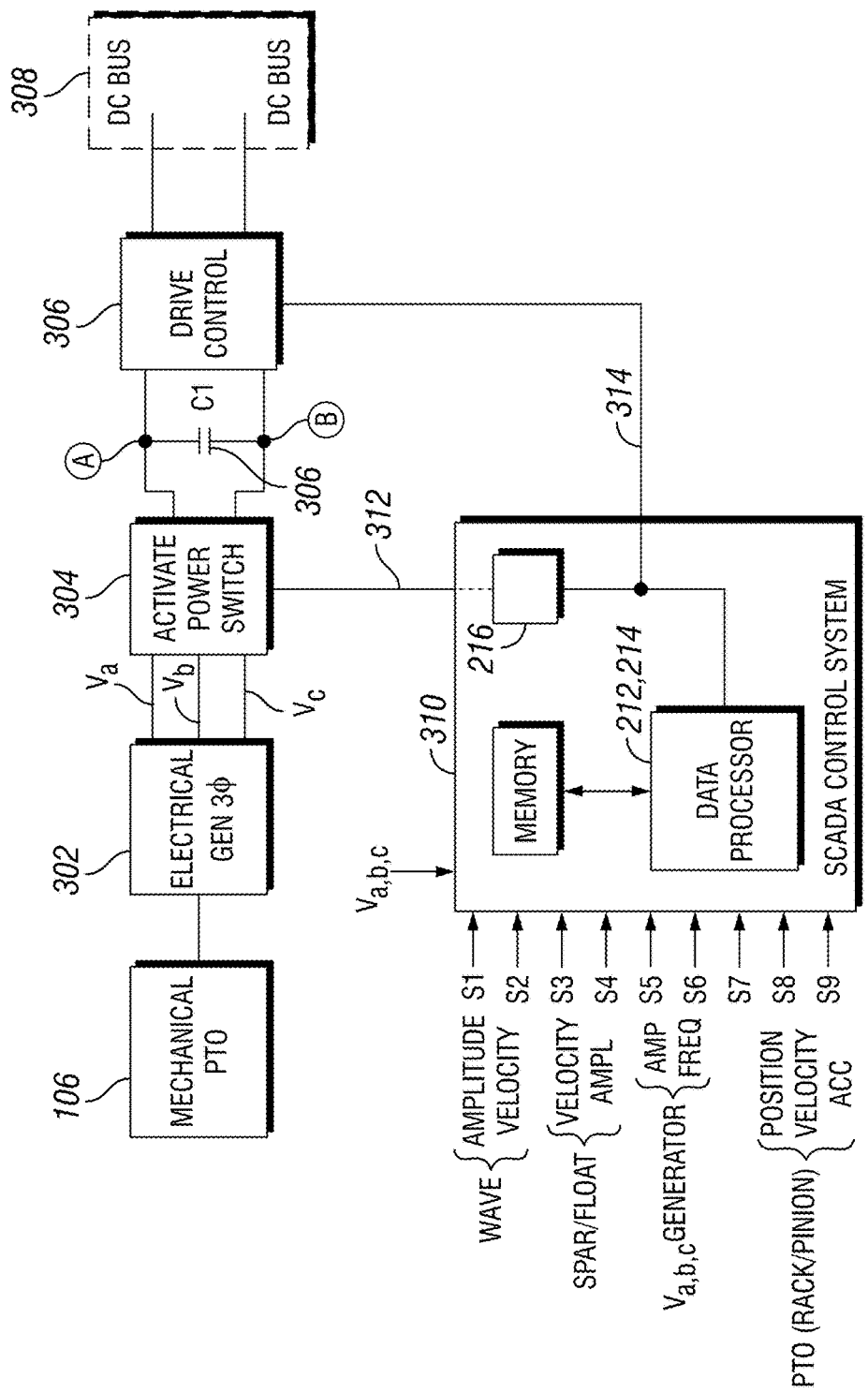
FIGS. 4 and 4A are block diagrams illustrating the conversion of the output of an electrical generator in accordance with the invention.
Figure 4A:
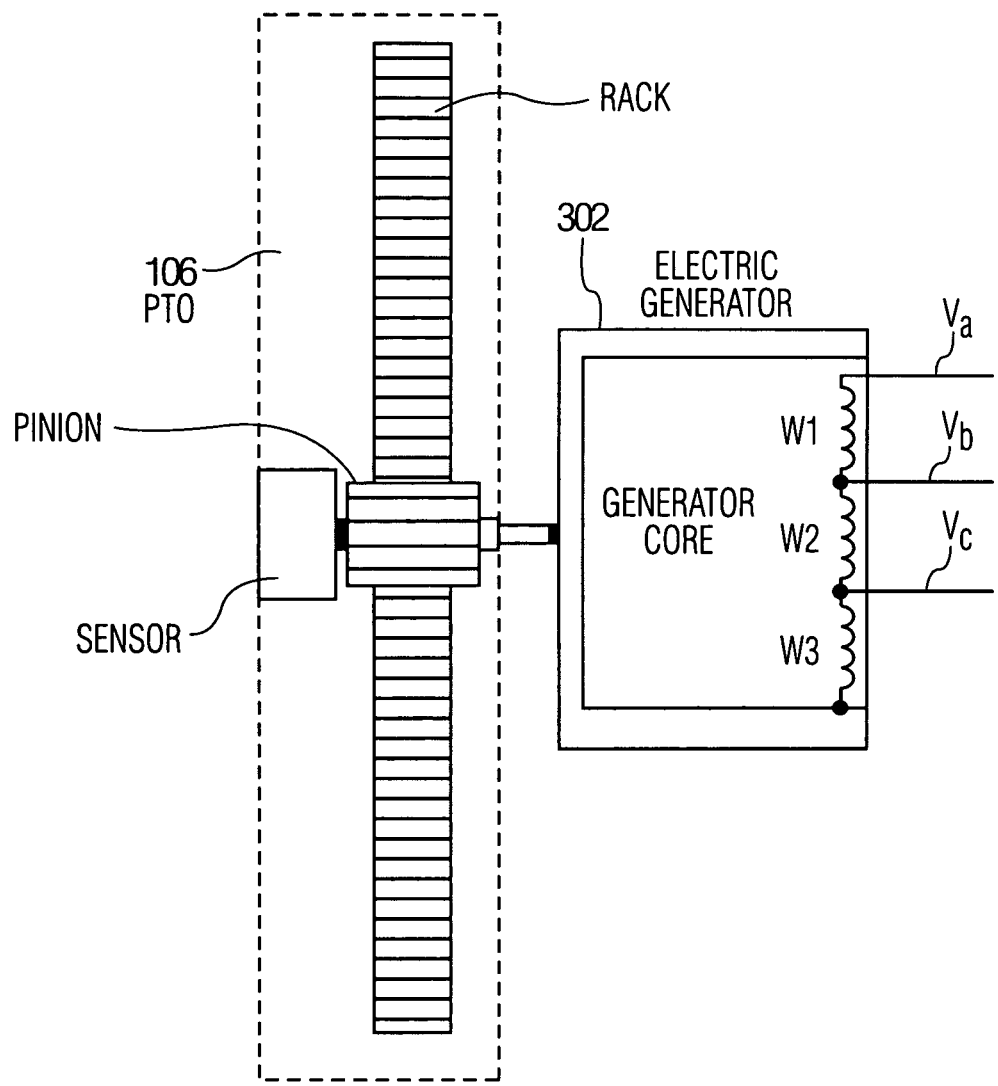
Figure 5:
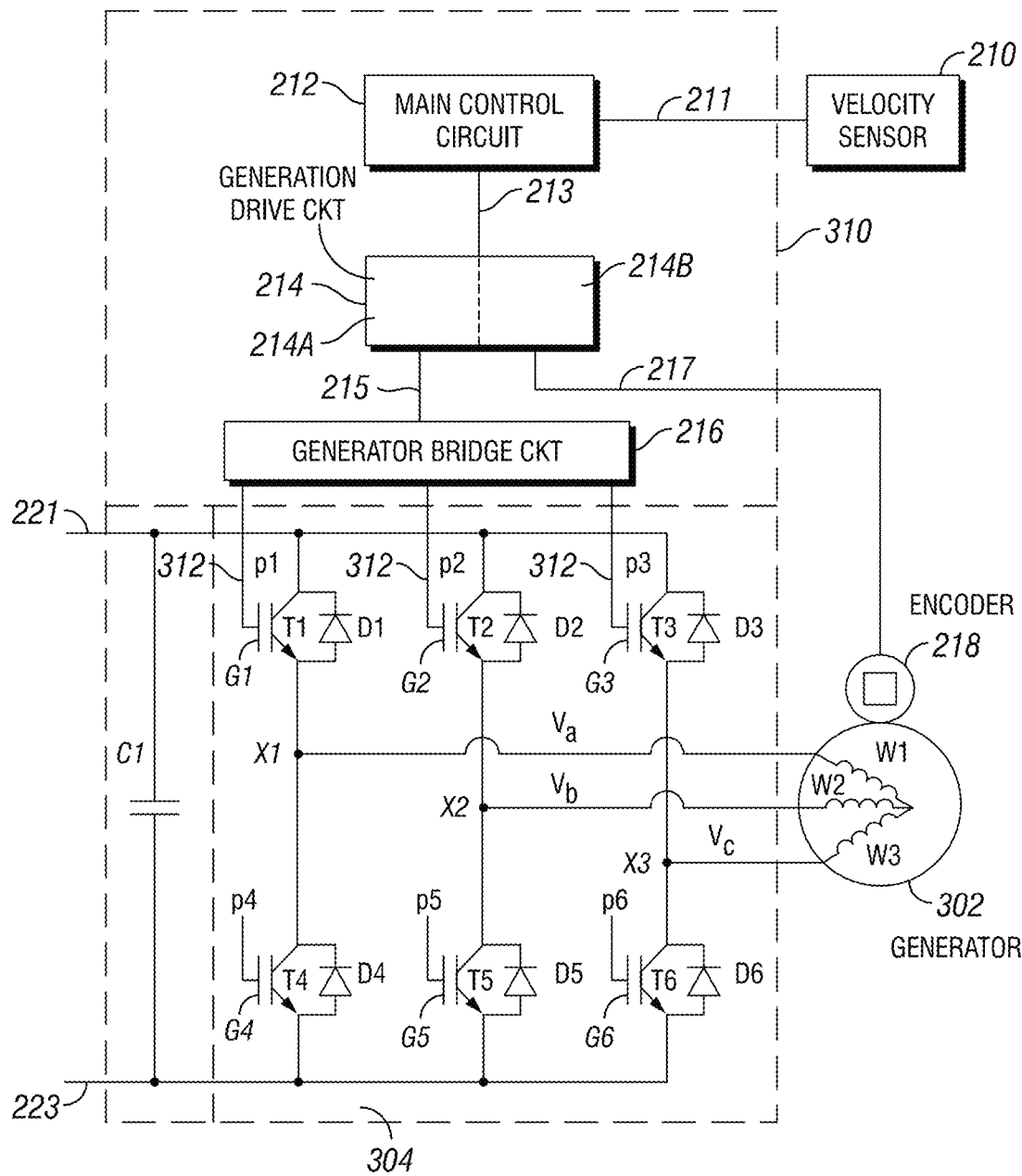
FIG. 5 is a semi-block semi-schematic diagram of circuitry used to practice the invention.

FIG. 4 shows in block form a mechanical PTO 106 driving a three (3) phase electric generator 302. In FIG. 4A, the PTO 106 is shown to be a rack and pinion system. However, PTO 106 may be any suitable device capable of converting the relative motion of the float and spar into mechanical energy suitable to drive an electric generator. In FIGS. 4A and 5, the electric generator 302 is shown to have windings (coils) w1, w2, w3, at which are produced 3-phase voltages Va, Vb, and Vc whose amplitudes are a function of the relative motion of the float and spar. The voltages Va, Vb, and Vc are alternating current (AC) signals whose amplitude may vary greatly from cycle to cycle as shown, for example, in FIGS. 2, 6A and 6B. The amplitude and frequency of voltages Va, Vb, and Vc is a function of the speed of rotation of generator 302 which in turn is a function of the relative movement of the float and spar which in turn respond to the waves ("sea conditions"). For a wave energy converter (WEC), the frequency of the electric generator signals may range from less than one (1) Hz to more than 60 Hz, depending on the wave frequency, generator pole counts, and gearing ratios of the PTO 106.

In FIGS. 4, 4A and 5, an active power switching circuit 304 is connected between the output of the electrical generator 302 and a charge (energy) storage element 306, which is shown, by way of example, to be a capacitor C1. Element 306 could also be a battery or any other suitable charge storage device. The switching circuit 304 functions as an AC to direct current (DC) converter. That is, it converts the AC signals Va, Vb, and Vc into a DC voltage stored across capacitor C1.

In normal operation, the power switching circuit 304 is operated so it samples and processes the outputs of the electric generator 302 at a rate which may typically range between 1 KHz and 10 KHz. [The sampling rate may be selected to have any value over a wide range of values. Its actual value is not critical to the invention so long as it is of much higher frequency than that of the signals/voltages (e.g., Va, Vb, Vc) being processed]. Power switching circuit (or AC to DC converter) 304 processes the energy in the electric generator windings and charges capacitor C1 correspondingly.

There are power losses associated with the switching of circuit 304 and with the generation of control signals to operate it. In accordance with the invention, the active power switching circuit 304 is controlled so as to be rendered operative when the power available from the electric generator is above a predetermined level (i.e., when it exceeds active and overhead power losses) and to be rendered inoperative (disabled) when the power available from the electric generator is below the predetermined level.

In FIGS. 4 and 5 there is shown a supervisory control and data acquisition (SCADA) controller 310 which is responsive to a number of different selected sensors to produce output signals (on line 312) for controlling the operation of AC to DC converter 304. FIG. 4 shows that the outputs of various sensors (e.g., S1-S9) may be supplied to SCADA control system 310. For example, sensor signals responsive to incoming wave amplitude and velocity can be supplied. Likewise, there can be supplied sensor signals, such as velocity or amplitude, responsive to movement between the spar and float and/or sensor signals responsive to the amplitude and/or frequency of the electric generator output voltages Va, Vb, and Vc or sensor signals responsive to position, velocity or acceleration of components of the PTO (e.g., rack and pinion). This is by way of illustration only and many other signals relating to the operation of the WEC may be supplied to the control system 310.

In order to determine whether to enable or disable active switching (i.e., converter 304 and/or its associated circuitry) sensors are used to provide an indication of the energy being supplied to the system and available to drive the electric generator. The sensors may be used to measure instantaneous PTO position, the velocity of incoming waves or spar/float movement or spinning of generator. We can measure both spar/float relative velocity and generator spinning (RPM) or generator voltage (e.g., it is possible to measure filtered average, we can also calculate the voltage accurately by using know generator parameters and RPM, or temperature of generator windings, average wave height, and other relevant data. As it pertains to the present invention, selected ones of the sensors function to provide signals (information) corresponding to the amount of energy which is being supplied to the WEC and available to drive the electric generator 302.

Control system 310 includes data processing means and driving circuits (212, 214, 216) which includes programming and memory means responsive to selected sensor signals. The data processing means is programmed to include a model of the WEC and its response to various selected signals so that the data processing means can determine (calculate) the "available" amount of power that the generator 302 can produce in response to selected sensed signal conditions. At the same time the data processing means is also programmed with data to determine the amount of power consumed (power loss) by the system to convert the generator output to a DC voltage. The difference between the available power and the power loss yields "net power". In accordance with the invention, the converter is operated only when there is positive net power. If the wave and signal conditions would result in negative net power, the converter is disabled.

To better appreciate sources of power loss and the problems it represents reference is made to the more detailed circuitry shown in FIG. 5. FIG. 5 shows a 3-phase electric generator 302, with coils w1, w2, and w3, for producing respective 3-phase alternating current (AC) voltages denoted as Va, Vb and Vc. Coil w1 has one end connected to a terminal X1 at which Va is produced, coil w2 has one end connected to a terminal X2 at which Vb is produced, and coil w3 has one end connected to a terminal X3 at which Vc is produced.

The AC voltages Va, Vb and Vc produced at the output of generator 302 are converted to a direct current voltage (VDC) via active power switching circuit 304 which includes controllable switching devices T1 through T6 connected between terminals X1, X2 and X3 and direct current (DC) bus lines 221, 223. A storage device, capacitor C1, is connected between the DC bus lines. In FIG. 5 the switching devices are insulated gate bipolar transistors (IGBTs). But, any other suitable power transistor or semiconductor device (e.g., power MOSFETs) may be used instead. Each one of the switching devices T1 through T6 has a corresponding gate (G1 through G6) to which may be applied a control signal (p1-p6), from bridge circuit 216, for controlling the turn on and turn off of its corresponding switching device. Each switching device has a diode (D1-D6) connected across its main conduction path.

In FIG. 5, SCADA control system 310 is shown to include a main control circuit 212 (which is part of the data processing and programming circuitry of SCADA 310) which is programmed to respond to signals 211 produced by a velocity sensor 210 which senses, and/or is responsive to, the relative movement of the float and spar. The circuit 212 generates command signals which are applied via line (s) 213 to a generator drive control circuit 214 which in turn produces signals which are: (a) applied to the generator bridge circuit 216 via line(s) 215; and (b) other enabling signals applied via line(s) 217 to an encoder 218 and/or like circuits (not shown). Circuit 216 is programmed to produce signals (p1-p6) applied to the control gates (G1-G6) of the switching transistors (T1-T6) to control their turn on and turn-off. As already noted, the switches (T1-T6) are turned on and off at a rate ranging, for example, between 1 KHz and 10 KHz.

Each of the 3 generator phases has a switch pair, which is used to regulate the current in both directions. A pattern is followed such that each pair of generator phases carries a balanced sinusoidal current waveform. For a 3 phase system, the current must be regulated in the coil from phase 1 to phase 2, the coil from phase 2 to phase 3, and the coil from phase 3 to phase 1. The control circuitry 212, 214, 216, is programmed to cause the sequencing of the switching power devices (T1-T6) through a predetermined switching pattern. In FIG. 5, under normal power generating conditions, in response to signals from velocity sensor 210, circuits 212, 214, 216 generate signals which adjust the switching pattern and duty cycle of each of the 6 semiconductor switches (T1-T6) until the current in each phase (coils w1, w2, w3) of the generator matches the commanded current target.

However, when the generator is rotating at low velocity (e.g., due to low amplitude wave conditions), the phase (coil) voltages (Va, Vb, Vc) and current levels are of very low amplitude (i.e., the power output of the generator 302 is low). If rectification via circuit 304 is attempted the amount of net power delivered to the DC bus capacitor may be less than the amount of power required to cycle through the current regulating switching pattern. This may result in zero or negative net power to the DC bus in cases where the power produced by the generator is less than the combined threshold and resistive loss components in the semiconductors plus the induced generator core and winding losses with power from the DC bus flowing into the generator coil(s), where it generates heat.

Applicant recognized that power switching circuit 304 includes bidirectional paths between the generator coils and the storage capacitor C1. As a result, when the power produced by the generator 302 is below a certain level, power is drawn from the storage capacitor C1 and discharged into the generator coils. The result is that there are eddy current and power losses in the generator 302 in addition to the power lost due to the switching of the circuit 304.

This is a significant problem which is minimized, if not eliminated in circuits and systems embodying the invention. Applicant recognized that the "available" power (i.e., the power which can be, or is being, generated by the electric generator 302) can be calculated by means of sensors (e.g., S1-S9) applied to a control system 310 which is pre-programmed to process the information. That is, knowing the characteristics of the float and spar, the PTO 106 and generator 302 and knowing (measuring or sensing) the forces driving these component it is possible to determine the available amount of power that can be, or is being, produced by the generator. In systems embodying the invention the power switching circuit 304 is deactivated (disabled) when the power which can be produced by the electric generator 302 is less than the power consumed by the switching circuit 304 and its associated circuitry. In accordance with the invention it is also possible to selectively deactivate circuit 214 (214A and/or 214B) and/or circuit 216 to save more power.

One aspect of the invention is predicting, in advance, the operating conditions where negative power flow would occur, and to then temporarily disable the semiconductor device switching circuitry (i.e., 216 and 304) until a combination of generator voltage and current exists that would result in net power production if active switching was re-enabled.

Systems embodying the invention include apparatus and methods for predicting the available power output of the electric generator 302 and for shutting down active rectification and semiconductor switching for operating conditions that would be expected to result in negative net power. For example, referring to FIGS. 6A and 6B, when the output voltages of the electric generator lies between levels L1 and L2 (i.e. the voltages are less positive than L1 or less negative than L2) the AC to DC converter 304 is disabled. The main control circuit 212 continuously reads in an instantaneous velocity reading from the velocity sensor 210. At specific times and at a rate which is generally 10 to 100 times per second, the circuit 212 uses a software model of generator drive circuits 214, 216, 304, and of electric generator 302 to determine if the system would be capable of generating net power for that instant in time. If the predicted net power level is negative, the main control circuit 212 does not allow the generator drive control circuits 214, 216 to actively switch the semiconductor bridge 304, which is then effectively disabled.

Figure 6A:
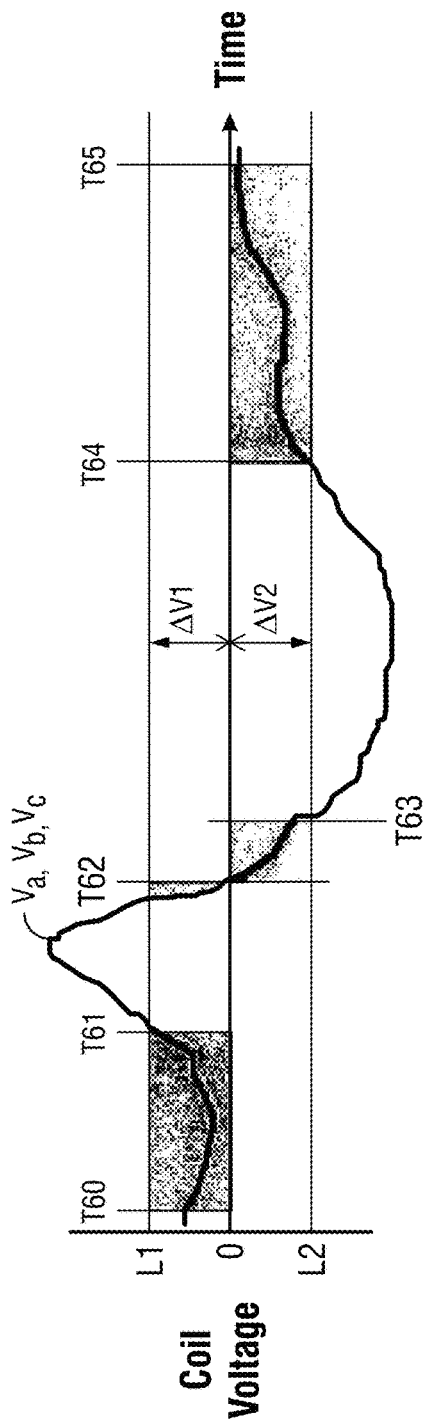
FIGS. 6A and 6B are diagrams of various waveforms which are processed in accordance with the invention.
Figure 6B:
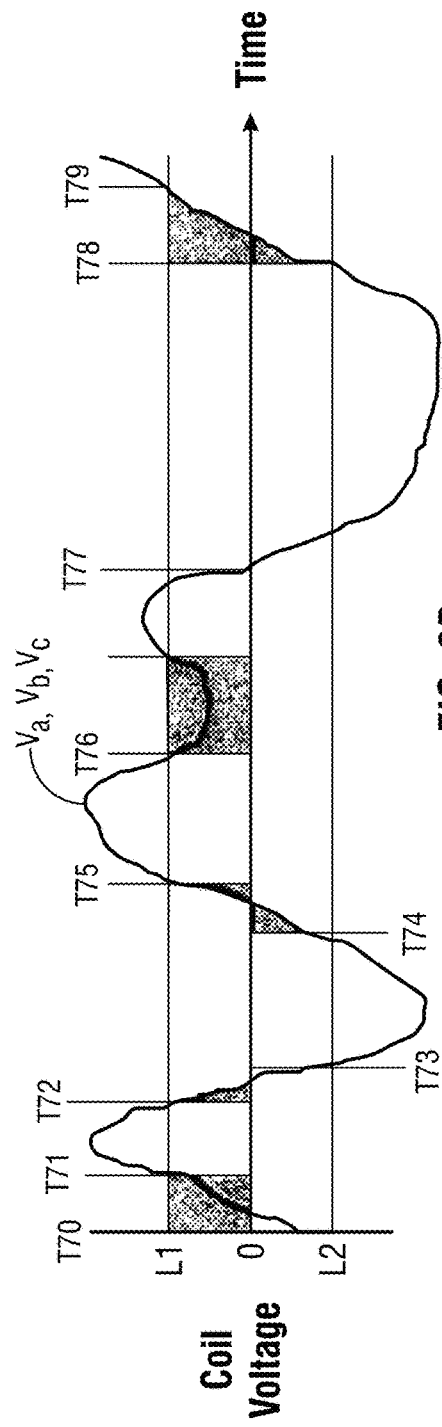

For most applications there will be a characteristic speed (e.g., of the velocity sensor or the generator) at which the active switching losses equal the resulting net power that could be obtained by active switching. At speeds above this characteristic speed, the generator drive will be enabled for normal operation, but at the start and tail of each wave as shown in FIGS. 6A and 6B, there will be instantaneous low speed regions that would result in negative net power generation if active switching were attempted. By disabling switching in these regions (e.g., between L1 and L2 in FIGS. 6A and 6B) there are several advantages:

1—No power is drawn from the DC bus and wasted on active switching when there is insufficient generator velocity to produce net power.
2—By reducing ripple current and core losses within the generator, the generator average operating temperature is reduced.
3—By reducing average generator operating temperature, the copper windings will be cooler when active switching is attempted, reducing resistance and increasing efficiency.
4—Losses in the power semiconductors are reduced, which lowers average operating temperature and increases device life and reliability.
5—By not applying active torque when no net power can be obtained, less effective damping force is applied to the moving section of the PTO, slightly increasing velocity and power recovery at times when the velocity is sufficient for net power generation.

Figure 7:
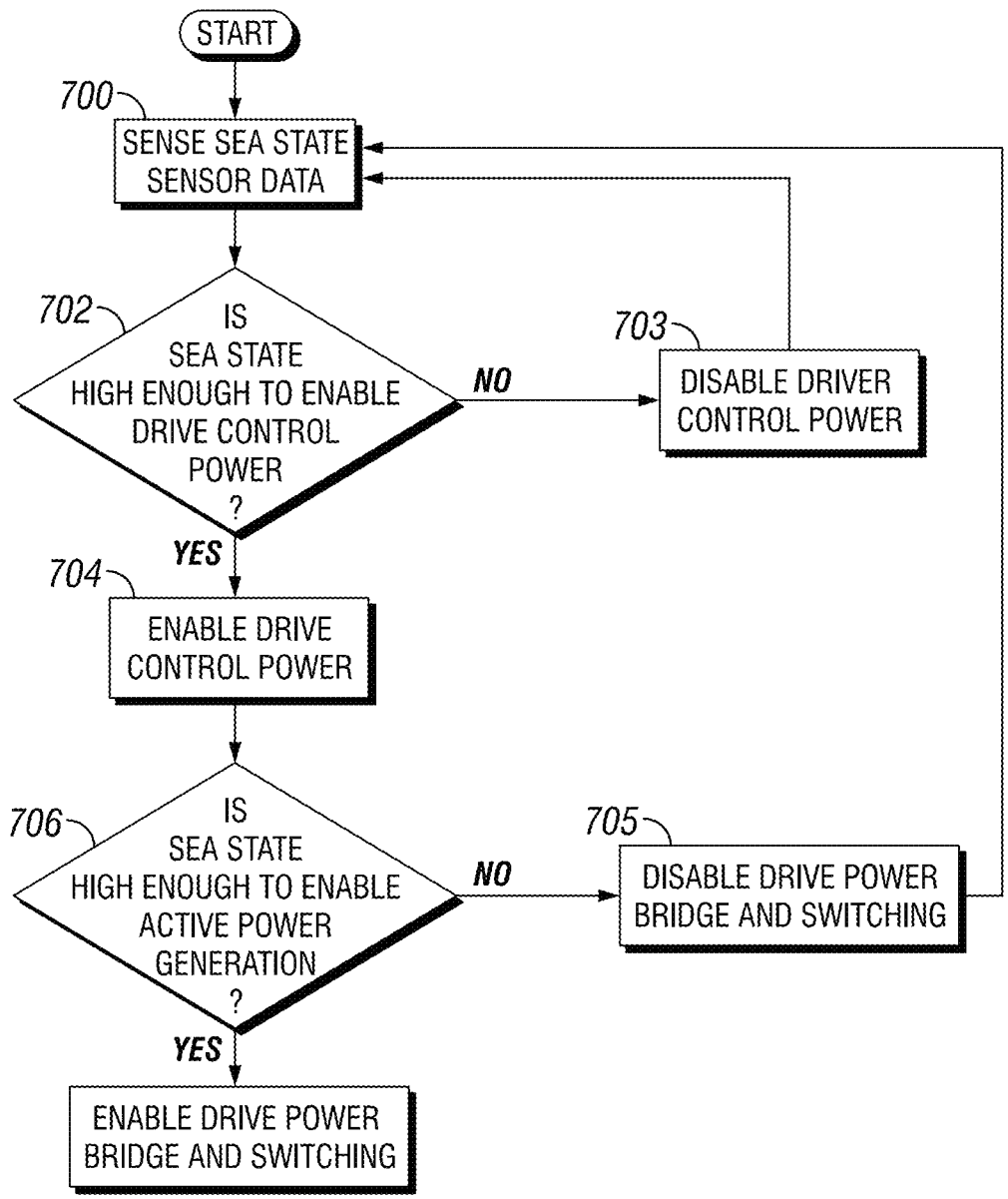
FIG. 7 is a flow chart illustrating two control conditions.

FIG. 7 is a flow chart illustrating a mode of operation. In this mode a first step (700) includes sensing sea state sensor data (corresponding to amplitude and activity of waves). If it is not sufficiently high (per 702), control circuit 214B in FIG. 5 is disabled. If it is sufficient high (per 702), then control circuit 214B in FIG. 5 is enabled (704), powering encoder 218. A second step (706) includes determining whether sea state is sufficiently high to enable active power switching. If not, control circuit 214A is disabled; If yes, circuits 214A, 216 and 304 are enabled.

Figure 8:
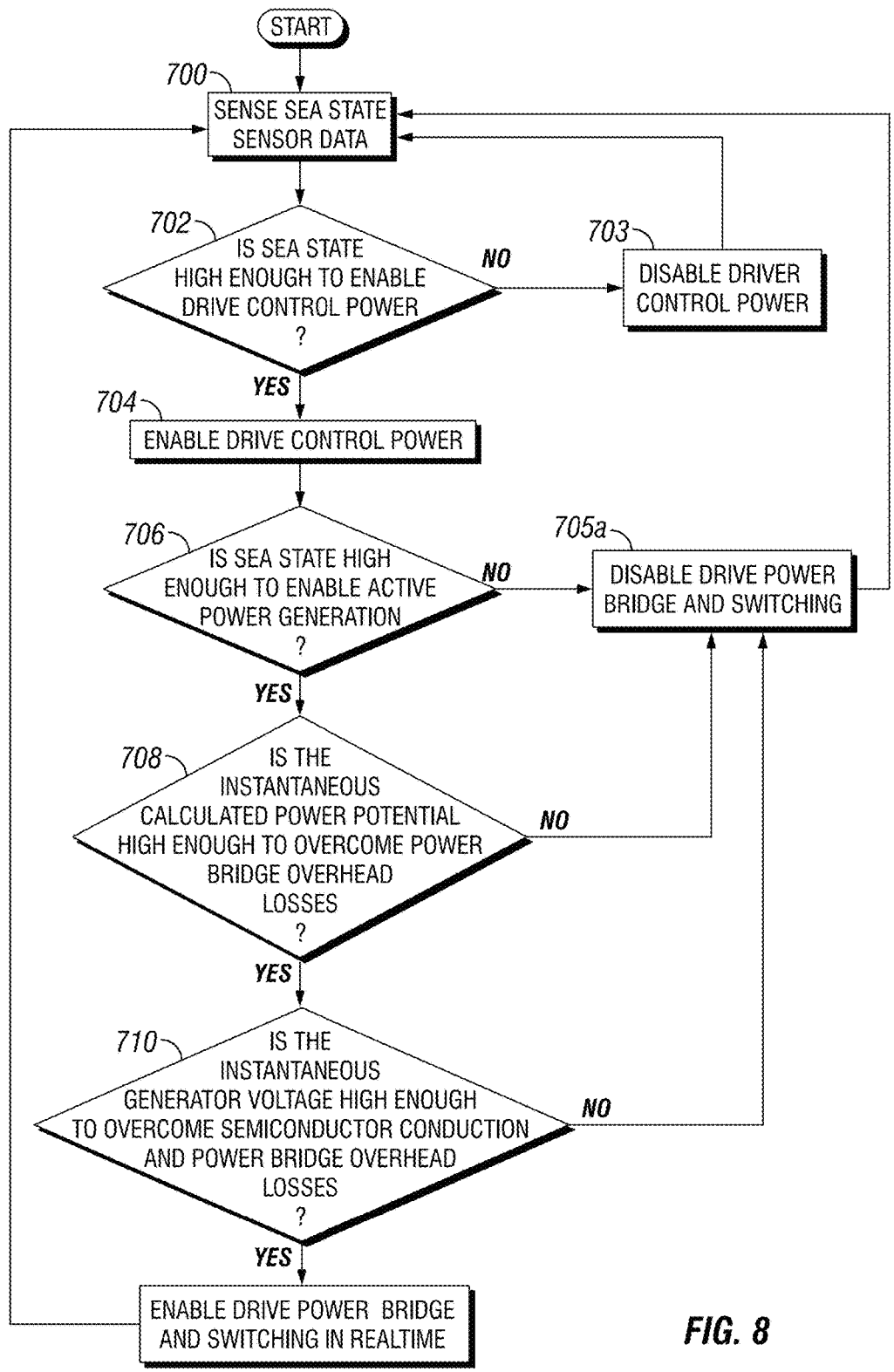
FIG. 8 is a flow chart illustrating three control conditions.

FIG. 8 is a flow chart which illustrates that the decision to turn the AC to DC converter 304 on or off can be made to include and depend on more detailed examination of different and additional sources of power consumption (i.e., power bridge 304 overhead losses as per step 708, and semiconductor (T1-T6) conduction losses in addition to overhead losses as per step 710.

Regarding Turn Off Criteria for the Encoder:

The encoder 218 is operational for all times where power generation capture might be attempted, this would be determined based on the average levels of wave activity, which can be calculated by measuring average wave height and period, or average PTO velocity. If wave activity and resulting PTO velocity is too low for an extended period of time (approximately 10 minutes to several hours), the SCADA system is programmed to determine that there is not a realistic chance of making net power and will shut down the generator drive circuit 214 (A and B) fully, including the controls and encoder in order to save power. When wave activity resumes, the drive and encoder can be powered back online. The drive controls and encoder are only shutdown to save power on a relatively long timescale of minutes to hours based on average wave activity levels, while the active switching function of the drive (e.g., 214A) can be shutdown on a timescale of milliseconds to seconds to save power between individual waves.

Figure 9:
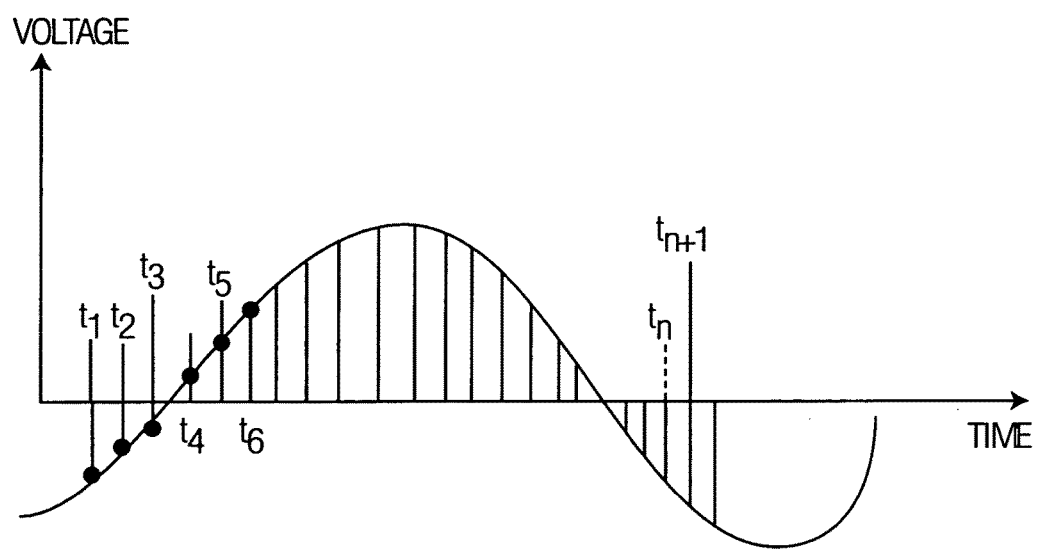
FIG. 9 is a waveform diagram used to illustrate an aspect of the invention.

FIG. 9 illustrates that the determination (calculation) of whether the available power exceeds the power losses can be made at distinct equally spaced time intervals. The sampling rate should be ten to 100 times per second. By way of example, assuming the switching of the IGBT bridge to be generally in the 2 kHz to 10 kHz range, with the waves occurring at a rate of 0.1-0.5 Hz, the calculations may be made at a rate of 10-100 Hz, depending on how much processor capacity is installed. 10 Hz would result in acceptable performance, while 100 Hz would provide very good performance.

Features of Circuit Components used to Practice the Invention

1—AC to DC converter Section 216 and 304 consumes the bulk of the standby power. The losses are a combination of driver power, switching losses, and eddy current losses induced in the generator core from the high frequency switching output. Section 304 does not contain any software or initialization routines, and can power up and enable rapidly (e.g., within 0.01 seconds). The components contained in circuit 304 are essential to power conversion when power is actively being generated but they waste and consume power whenever activated, even when the WEC is essentially idle.

2—The generator drive control circuit 214 is divided into two sections 214A and 214B. Section 214A drives the fast responding but high loss active generation section (216, 304) and section 214B drives the slow to respond electronics, such as encoder 218. The fast responding but high loss active generation section (216, 304) is switched on and off in real time for each wave as selected sensors are used to determine if the expected power generated would exceed the losses associated with the active generation section. Generally, the slow to react control electronics (e.g., encoder 218) remain powered over many wave cycles and maintain constant synchronization with the generator 302. However, if there is very low wave activity for a predetermined period of time, the encoder 218 is also disabled.

3. The SCADA controller 310 uses inputs from selected sensors to determine if the mechanical input power level and velocity would result in net power generation. The determination may be done by sampling selected signals at predetermined time intervals as discussed with respect to FIG. 9 and as illustrated in FIGS. 7 and 8. The electric power that would be generated by the generator can be calculated and compared to the power losses in the circuits and the generator. [Note: the input voltage must also be high enough to overcome the threshold voltage drop in semiconductor devices and result in net power generation, even if the mechanical input power seems sufficient.]

4. If the SCADA controller 310 determines that the input mechanical power and voltage conditions are adequate to produce net power, the generator drive (214A in FIG. 5) will be sent a startup command to drive bridge circuit 216 and initiate full active current control of the bridge switching circuit 304 at the KHz rate.

5. The generator drive 214A will enable the switching drivers, to quickly re-establish phase synchronization and proper commutation, and start active current control. This process may take, for example, 2.5 to 50 milliseconds to complete. The entire process must be fast enough to allow wave by wave operation.

6. The generator drive 214 (A, B) will remain in active current control mode and will accept commands to operate from the SCADA controller (212 in FIG. 5) to optimize power generation.

7. When the SCADA system determines that the mechanical input power level and voltage is no longer sufficient to overcome the core and switching losses associated with active torque control, the generator drive 214A will be commanded to shutdown all active switching functions and go into a low power mode until adequate power generation conditions return with the next wave. The percentage of time spent in the low power standby mode is typically small in high sea state conditions, where the shutdown period only spans a fractional second period around the zero crossings of the sinusoidal input power profile. But, in low sea states the shutdown period can span several seconds during lapses in wave activity, and can exceed 50% of the overall operational time.

8. Thus, systems embodying the invention include means for predicting the operating conditions where negative power flow would occur and, for those conditions, temporarily disable the semiconductor device switching circuitry until a combination of generator voltage and current exists that would result in net power production.

There is some mechanical power present in response to low velocity conditions. However, this energy would be lost if active switching was attempted. By disabling active power switching, the low velocity mechanical input energy can instead be stored in the form of kinetic energy or buoyancy in the mechanical stage of the wave power converter, and can be later recovered more efficiently during higher velocity conditions.

The apparatus and methods of the invention increase net power production in low sea states (low wave conditions) and in high sea states (high wave conditions). In low sea states where the standby periods are much longer and the peak active generation regions produce less input power, making use of the invention can improve net power generation by up to 40%. In very low sea states, it can also make the difference between a long term average power loss and a long term net power gain. Under high sea states, the power generation in the active generation periods will be orders of magnitude greater than the fixed standby losses and making use of the invention, as described above, would improve efficiency by a few percentage points While most applications relating to sources of renewable energy have periods of inactivity where they will need to shutdown and go into power save mode, these events may be infrequent and several hours apart. However, in wave power applications, these periods of inactivity occur very frequently, sometimes more than a thousand times per hour. There is no power production possibility between waves, as well as at the exact peak and trough of the waves when the device stops to change direction. Each of these periods of inactivity may only last a second or two, but they can add up to a significant percentage of the total time in low wave states.

In accordance with the invention, the system is programmed to provide wave-to-wave drive switching and a shutdown mechanism to increase overall efficiency and power generation. The system embodying the invention includes the use of algorithms to process sensor data and predict what would happen if power conversion was attempted. This is based on the modeling of the WEC and its response to the application of selected sensor signals. Based on the known behavior of the WEC and its components (e.g., generator 302) it is possible to determine those sensor signals for which there is a transition point from power waste to net power generation. This enables the production of control signals enabling (or disabling) converter 304 and/or any of its associated driving circuits (i.e., 214, 216). This generates the following results:

1. How many joules of energy we could expect to harvest should active switching and torque control be enabled
2. How many joules would be lost due to heat in the generator core, generator windings, IGBT devices, and other parts of the system
3. How much PTO velocity would be lost due to the amount of power recovered and the amount of waste heat lost in the process [extracting power acts like a brake on the PTO]. Each attempt to draw power slows down the PTO, which is acceptable if usable net power is being extracted. However this is bad if there is net power loss and the kinetic energy which could have been recovered at a later time step is lost.

Although the PTO will always have a near constant amount of stored kinetic energy relative to its instantaneous velocity, the efficiency of converting this kinetic energy to usable electrical energy can vary greatly. Attempting to extract the energy by actively switching converter 304 (the generator torque) at low velocity is very inefficient. It can generate more waste heat than usable electrical energy, and results in undesirable PTO slowdown for little net energy gain.

By disabling the converter 304 for low wave conditions, the PTO can retain its kinetic energy at times where it would be inefficient to attempt the conversion from mechanical energy to electrical energy. When the SCADA system determines conditions are ideal for high efficiency power conversion, the kinetic energy stored in the PTO can be converted to electrical energy much more quickly and efficiently, reducing the amount of waste heat generation and increasing net energy harvest.

Whenever the generation drive is actively switching and regulating load current in the generator windings to develop torque which is applied to the moving PTO system, power is generated but the relative motion between float and spar (system velocity) is reduced and losses are incurred due to the overhead and inefficiencies in the power generation equipment.

The algorithm has been tested in sea trials with good results. On lower wave activity days where much time is spent at low velocity, the improvement in power generation is very significant.

What is claimed is:

1. A system comprising:
a wave energy converter (WEC) apparatus intended to be placed in a body of water and responsive to waves, said waves having varying amplitude, frequency or velocity;
said WEC apparatus being coupled to and driving an electric generator, said electric generator having an output at which is produced an alternating current (AC) output voltage, the AC output voltage having an amplitude and a frequency, wherein at least one of the amplitude and the frequency varies in response to, and corresponding to, the varying amplitude, frequency or velocity of said waves;
an energy storage element;
a controllable active switching circuit, the controllable active switching circuit being coupled between the output of said electric generator and said energy storage element to convert the AC output voltage of the electric generator into a direct current (DC) voltage stored across said energy storage element, said controllable active switching circuit being characterized in having associated therewith a conversion power loss when performing an AC to DC conversion;
data processing circuitry, said data processing circuitry being coupled to the controllable active switching circuit;
wherein said data processing circuitry is programmed for determining the amplitude of the AC output voltage;
wherein said data processing circuitry is programmed for disabling the controllable active switching circuit when the amplitude of the AC output voltage is less than a predetermined value, wherein said predetermined value has to be exceeded to overcome the conversion power loss;
wherein said data processing circuitry includes circuitry and at least one sensor to generate selected signals indicative of the varying amplitude, frequency or velocity of the waves,
wherein said data processing circuitry is further programmed for calculating an electric power available at the output of the electric generator for each wave of said waves using the selected signals; and
wherein said data processing circuitry is programmed to compare the calculated electric power available at the output of the electric generator for each wave to the conversion power loss and to disable the controllable active switching circuit based on the comparing.

2. A system as claimed in claim 1 wherein:
said WEC apparatus includes a float and a spar which move relative to each other in response to the waves; and
said WEC apparatus includes a mechanical power take off device (PTO) coupled between the float and the spar to convert their relative motion into mechanical energy to drive said electric generator; and
said energy storage element is one of a capacitor and a battery.

3. A system as claimed in claim 2 wherein the selected signals generated by the at least one sensor are selected from the group consisting of a wave amplitude, a wave velocity, a relative velocity between the spar and the float, a relative amplitude between the spar and the float, a position of the PTO, a velocity of the PTO, an acceleration of the PTO, and a spinning velocity of the electric generator.

4. A system as claimed in claim 1 wherein:
said controllable active switching circuit includes semiconductor switches and a bridge circuit whose output controls the semiconductor switches, said semiconductor switches being characterized in having associated therewith a conduction loss, said bridge circuit being characterized in having associated therewith an overhead loss; and
said data processing circuitry is further programmed to disable the controllable active switching circuit based on a comparison between the calculated electric power available at the output of the electric generator and the overhead loss.

5. A system as claimed in claim 1 wherein:
said data processing circuitry includes a drive circuit whose output controls: (a) fast responding circuitry including the controllable active switching circuit; and (b) slow responding circuitry including encoding circuitry; and
said data processing circuitry is further programmed to disable the drive circuit when the calculated electric power available at the output of the electric generator is below a predetermined level for a predetermined period of time.

6. A system as claimed in claim 5 wherein:
said controllable active switching circuit includes semiconductor switches and a bridge circuit whose output controls the semiconductor switches, said semiconductor switches being characterized in having associated therewith a conduction loss, said bridge circuit being characterized in having associated therewith an overhead loss; and
said data processing circuitry is further programmed to disable said controllable active switching circuit when the calculated electric power available at the output of the electric generator is less than the overhead loss.

7. A system as claimed in claim 1 wherein the at least one sensor includes a velocity sensor or a spinning velocity sensor.

8. A system comprising:
a wave energy converter (WEC) apparatus intended to be placed in a body of water and responsive to waves, said waves having varying amplitude, frequency or velocity;
said WEC apparatus being coupled to and driving an electric generator, said electric generator having an output at which is produced an alternating current (AC) output voltage, the AC output voltage having an amplitude and a frequency, wherein at least one of the amplitude and the frequency varies in response to, and corresponding to, the varying amplitude, frequency or velocity of said waves;
an energy storage element;
a controllable active switching circuit, the controllable active switching circuit being coupled between the output of said electric generator and said energy storage element to convert the AC output voltage of the electric generator into a direct current (DC) voltage stored across said energy storage element, said controllable active switching circuit being characterized in having associated therewith a conversion power loss when performing an AC to DC conversion;
data processing circuitry, said data processing circuitry being coupled to the controllable active switching circuit;
wherein said data processing circuitry is programmed for determining the amplitude of the AC output voltage;
wherein said data processing circuitry is programmed for disabling the controllable active switching circuit when the amplitude of the AC output voltage is less than a predetermined value, where said predetermined value has to be exceeded to overcome the conversion power loss;
wherein said data processing circuitry includes at least one sensor and circuitry to generate selected signals indicative of the varying amplitude, frequency or velocity of the waves,
wherein the amplitude of the AC output voltage alternates at a first rate (f1); and
wherein said controllable active switching circuit is operated to sample the AC output voltage at a second rate (f2), which is much higher than said first rate; and
wherein said data processing circuitry is programmed for calculating an anticipated electrical power available at the output of the electric generator based on the selected signals, said calculating being performed at a third rate (f3) which is greater than f1 and less than f2; and
wherein said data processing circuitry is further programmed for disabling said controllable active switching circuit based on the calculated anticipated electrical power available at the output of the electric generator.

9. A system as claimed in claim 8 wherein said electric generator is a 3-phase generator; wherein said data processing circuitry includes a main control circuit and memory circuitry having outputs coupled to a drive circuit having a plurality of sections; and wherein one of the plurality of sections of the drive circuit disables the controllable active switching circuit.

10. A system as claimed in claim 8 wherein the at least one sensor includes a velocity sensor or a spinning velocity sensor.

11. A system comprising:
a wave energy converter (WEC) apparatus intended to be placed in a body of water and responsive to waves, said waves having varying amplitude, frequency or velocity;
said WEC apparatus being coupled to and driving an electric generator, said electric generator having an output at which is produced an alternating current (AC) output voltage, the AC output voltage having an amplitude and a frequency, wherein at least one of the amplitude and the frequency varies in response to, and corresponding to, the varying amplitude, frequency or velocity of said waves;
a rotary encoder coupled to the electric generator and associated encoding circuitry;
an energy storage element;
a controllable active switching circuit, the controllable active switching circuit being coupled between the output of said electric generator and said energy storage element to convert the AC output voltage of the electric generator into a direct current (DC) voltage stored across said energy storage element, said controllable active switching circuit being characterized in having associated therewith a conversion power loss when performing an AC to DC conversion;
data processing circuitry, said data processing circuitry being coupled to the controllable active switching circuit;
wherein said data processing circuitry is programmed for determining the amplitude of the AC output voltage;
wherein said data processing circuitry is programmed for disabling the controllable active switching circuit when the amplitude of the AC output voltage is less than a predetermined value, where said predetermined value has to be exceeded to overcome the conversion power loss;
wherein said data processing circuitry includes at least one sensor generating a signal indicative of the varying amplitude, frequency or velocity of the waves; and
wherein said data processing circuitry is further programmed for independently disabling the controllable active switching circuit and the encoding circuitry as functions of the signal generated by the at least one sensor.

12. A system as claimed in claim 11, comprising:
a float and a spar which move relative to each other in response to the waves; and
a mechanical power take off device responsive to the relative motion between the float and the spar, the mechanical power take off device coupled to said electric generator to convert the relative motion of the float and spar into mechanical energy to drive said electric generator,
wherein said data processing circuitry is programmed for disabling the controllable active switching circuit as a function of an amount of energy being supplied by the waves on a wave-to-wave basis; and wherein said data processing circuitry is programmed for disabling the encoding circuitry as a function of an amount of energy supplied to the electric generator over a predetermined time period.

13. A system as claimed in claim 12 wherein the signal generated by the at least one sensor is selected from the group consisting of a wave amplitude, a wave velocity, a relative velocity between the spar and the float, a relative amplitude between the spar and the float, a position of the PTO, a velocity of the PTO, an acceleration of the PTO, and a spinning velocity of the electric generator.

14. A system as claimed in claim 11 wherein the at least one sensor includes a velocity sensor.

15. A system as claimed in claim 11 wherein the at least one sensor includes the rotary encoder.

* * * * *